US012086671B2

(12) United States Patent
Lenttan (10) Patent No.: US 12,086,671 B2
(45) Date of Patent: Sep. 10, 2024

(54) METHOD OF EMBEDDING A TRACKING DEVICE IN A JEWEL AND TRACKING METHOD THEREFOR

(71) Applicant: INSPIREDRING S.R.L., Milan (IT)

(72) Inventor: Avel Lenttan, Milan (IT)

(73) Assignee: INSPIREDRING S.R.L., Milan (IT)

( * ) Notice: Subject to any disclaimer, the term of this patent is extended or adjusted under 35 U.S.C. 154(b) by 154 days.

(21) Appl. No.: 17/790,219

(22) PCT Filed: Dec. 29, 2020

(86) PCT No.: PCT/IB2020/062512
§ 371 (c)(1),
(2) Date: Jun. 30, 2022

(87) PCT Pub. No.: WO2021/137150
PCT Pub. Date: Jul. 8, 2021

(65) Prior Publication Data
US 2023/0078994 A1    Mar. 16, 2023

(30) Foreign Application Priority Data

Dec. 31, 2019  (IT) .................... 102019000025825

(51) Int. Cl.
*G06K 7/10* (2006.01)
*A44C 27/00* (2006.01)
*G06K 19/077* (2006.01)

(52) U.S. Cl.
CPC ...... *G06K 19/07762* (2013.01); *A44C 27/006* (2013.01); *G06K 7/10* (2013.01)

(58) Field of Classification Search
None
See application file for complete search history.

(56) References Cited

U.S. PATENT DOCUMENTS

| 8,310,367 | B1* | 11/2012 | Vishwanath | ....... G06K 19/0773 340/572.1 |
| 2006/0093998 | A1* | 5/2006 | Vertegaal | ................ G06F 3/011 705/7.29 |

(Continued)

FOREIGN PATENT DOCUMENTS

| CN | 107518538 B | 7/2019 |
| WO | 2014/161071 A1 | 10/2014 |

OTHER PUBLICATIONS

International Search Report, European Patent Office, Mar. 10, 2021.

(Continued)

*Primary Examiner* — John F Mortell
(74) *Attorney, Agent, or Firm* — Bay State IP, LLC (57) ABSTRACT

An anchoring element of a tracking device comprising an electronic tag with a unique identification, an embedding method, and a tracking method of a metal precious object provided with such tracking devices are disclosed. The method comprises the steps of embedding said electronic tag with a unique identification in a ceramic case, embedding said ceramic case in an anchoring element in the shape of a metal frame with open faces, joining said anchoring element to a portion of said metal precious object by laser micro welding, wherein said step of embedding said ceramic case provides to defining at least a recess for each side of said metal frame, locating said case inside the perimeter of said metal frame through said through-slit and blocking it there by means of local melting of material of the same nature of said metal frame so as to obstruct an opening of said through-slit.

10 Claims, 5 Drawing Sheets

(56) References Cited

U.S. PATENT DOCUMENTS

2015/0178532 A1\* 6/2015 Brule ................... G06Q 20/321
　　　　　　　　　　　　　　　　　　　　　　　　705/41
2019/0188547 A1\* 6/2019 Kato .................... H01Q 21/061

OTHER PUBLICATIONS

Written Opinion of the International Searching Authority, European Patent Office, Mar. 10, 2021.

\* cited by examiner

METHOD OF EMBEDDING A TRACKING DEVICE IN A JEWEL AND TRACKING METHOD THEREFOR

CROSS REFERENCE TO RELATED APPLICATION

This application is for entry into the U.S. National Phase from which priority is claimed under all applicable sections of Title 35 of the United States Code including, but not limited to, Sections 120, 363, and 365 (c) to International Application No. PCT/IB2020/062512 filed on Dec. 29, 2020, and which in turn claims priority under 35 USC 119 to Italian Application No. 102019000025825 filed on Dec. 31, 2019.

FIELD OF THE INVENTION

The present invention relates to an improved method of embedding a tracking device in a jewel and relative system and method of tracking a precious product.

STATE OF THE PRIOR ART

As known, in the treatment activity of precious items, such as jewels and gemstones, the use of tracking methods and devices applied to the packaging or directly to the jewel has been common already for some time, in order to document the history, the origin, the genuineness thereof and therefore guaranteeing full transparency to the end user.

In particular, in such framework, electronic identification tags—for example the ones complying with the RFID (Radiofrequency Identification) technology already widely used in inventory activities and warehouse management—have proved particularly useful also in preserving the unique identification of the precious items, at least for the purposes of guaranteeing the genuineness thereof.

For such purpose, in the RFID tags information relating to the unique identity of the jewel are stored, as it is peculiar of the RFID technology.

Up until today it has been proposed that the RFID tag be applied onto a package peculiar to the precious item or that it be in some way applied to the jewel.

For the application to the jewel, i7 has already been proposed that the RFID device (comprising the electronic unit and the antenna thereof) be introduced into a small-sized enclosure—commonly a capsule or an impact-resistant pod, but transparent to electromagnetic signals—which is anchored to the jewel by using gluing materials, employed in gluing techniques, or filler metals, employed in welding techniques. An example of an electronic tag embedded in ceramic material is disclosed in CN 107518538. However, today's installation techniques of the RFID tag directly onto the jewel have proved ineffective both in guaranteeing that the RFID tag remains permanently in its seat, following various stresses, and at the same time to guarantee an electromagnetic transmission capability, not impaired by interference and/or by shielding, to be able to easily achieve a proximity reading with a reading detector.

As a matter of fact, it is known that the metal present in the jewel, in combination with the typically enshrouding layout of the jewel, acts as shield, inevitably leading to insulate the RFID tag.

As a matter of fact, the arrangement of the RFID tag desirably takes place in positions inside the jewel, due to obvious aesthetic reasons, and that inexorably leads to signal shielding of a greater or lesser degree, invalidating the communication with the reading terminal.

Moreover, during the transmission of the electromagnetic signals necessary for reading the electronic identification tag, due to the presence of the surrounding metal area, secondary electromagnetic fields are easily triggered, which interfere with the standard transmission and make the contents of the identification tag virtually unreadable.

Moreover, the conventional welding operations with filler material, meant to join the RFID to the jewel, imply significant drawbacks both on the RFID tag or on its enclosure, and on the jewel aesthetics and genuineness.

Instead, as regards the gluing techniques, the adhesive materials used have the drawbacks of not being able to maintain a high cohesive fracture toughness over time, following for example repeated abrasive actions, vibrations, impacts and environmental factors, thus leading to the final detachment of the enclosure from the jewel, as well as to produce detrimental toxic or carcinogenic effects, harmful for the wearer's skin.

WO2014161071 discloses a system, and relative method, for the identification and the authentication of jewelry items, which comprises an RFID tag applied to a jewel, an RFID tag reader and a processing and display unit connected to the reader. According to this known-art solution, the RFID tag is embedded in a dielectric means with electromagnetic absorption, in turn inserted in a small housing cavity practiced in the jewel material and kept cohesive there by means of epoxy resins. A further thin layer of epoxy resin is applied to close the cavity in order to avoid that the RFID tag be damaged by the chafing with the skin or by chemical agents, allowing the desired electromagnetic properties during the transmission toward the reader.

As set forth in the above document, the RFID tag is housed in a cavity obtained by moulding or laser-engraved. It is hence understood that in order to prepare the housing of the RFID tag it is necessary to operated changes a priori directly to the metal which the jewel is made up of, inevitably impairing the integrity of the same jewel.

Moreover, the result of any invasive operation apt to accomplish a housing cavity of part or all the tracking device, which is not initially conceived in the original jewel design, can be highly unsightly.

Moreover, although epoxy resins well withstand impacts and also have a fair resistance to chemical agents, it is well known that, under the action of aggressive products, for example used in cleaning the jewel, or in contact with detergent products for the care and beauty of the human body, they may release toxic agents which might cause skin rashes or allergic reactions.

In addition, as explicitly conveyed by the above document, the epoxy resin is wound around the entire means hosting the RFID tag, in order to apply to the RFID tag a valid protection from external factors and at the same time also a greater cohesion with the jewel. That implies evident blemishes, which are often visible on the jewel outside. If instead the cavity is obtained in a hidden location, the RFID housed there would end up being shielded by the metal material which conceals it and it is hence difficult to perform a proximity reading of the data contained in the RFID. In that respect, it must be considered that epoxy resins are not materials naturally used in goldsmith's workshops, so that it is uncomfortable and unwelcome to arrange the equipment and the preservation techniques necessary for such two-component thermosetting resins.

It must be noted that an easy reading of the small RFID transponder is instead paramount, not only because operators are typically inexperienced in handling electronic devices, but also because it affects the potential purchaser's perceived experience, who—if he or she finds it difficult to read the authenticity data—tends to take up a suspicious attitude.

Moreover, it must be noted that the interaction of three different materials, the one which makes up the enclosure of the RFID tag, the layer of epoxy resin and the jewel metal, complicate the structure of the media run through by the electromagnetic signal, determining a further obstacle to the normal electromagnetic coupling between the RFID tag and the reader, hence invalidating the transmission quality thereof.

Moreover, the anchoring operations of the RFID device to the jewel described in the above document are rather severe as time and accuracy are concerned, due to the fact that it is necessary firstly to accomplish a cavity, then filling the cavity with resin and, after having introduced the enclosure into the cavity, closing the opening of the enclosure by means of a further resin layer.

Finally, the processing and displaying unit of the data transmitted by the tag, as described in the cited document, is free from any encryption system or by any information inviolability technology, to be better used in transactions travelling through Internet networks.

The need is therefore felt to provide a solution which overcomes the drawbacks of the prior art. In particular, it is wished to provide a mounting mode of a tracking device in a jewel which is capable of implementing a permanent anchoring of the tracking device, without impairing the integrity of the same jewel, and allowing at the same time an electromagnetic coupling with a reading device which, to a perceptibly smaller degree, is free from interference and obstacles present in the transmission means through which signal propagation occurs. It is furthermore wished to be able to provide a tracking system of such RFID tag, which guarantees all the subjects involved in the jewel treatment (producers, sellers, purchasers, valuers, . . . ) to be able to have reliable data which is updated, guaranteed and easily accessible with reserved access.

SUMMARY OF THE INVENTION

The object of the present invention is therefore to provide a mounting method for tracking devices, and system thereof, particularly suited to applications on precious items, which solves the above-cited problems and allows nevertheless an economic advantage from a construction and maintenance point of view.

A solution according to the invention is achieved through a method and a relative anchoring element having the features defined in the independent claims herewith enclosed. Other preferred features of the invention are defined in the dependent claims.

BRIEF DESCRIPTION OF THE DRAWINGS

Further features and advantages of the invention will in any case be more evident from the following detailed description of a preferred embodiment of the same, provided purely as a non-limiting example and illustrated in the attached drawings, wherein.

DETAILED DESCRIPTION OF THE PREFERRED EMBODIMENT

In the following a mounting method is described of an electronic identification tag in a jewel or other valuable object, referring for convenience to a so-called RFID tag, but it is understood that other miniature devices containing unique identification data can also be similarly employed.

The electronic identification tag is securely embedded in the jewel in order to perform a unique tracking.

The embedding method according to the invention employs a particular anchoring element of the identification tag applied to the jewel.

Figure 1:
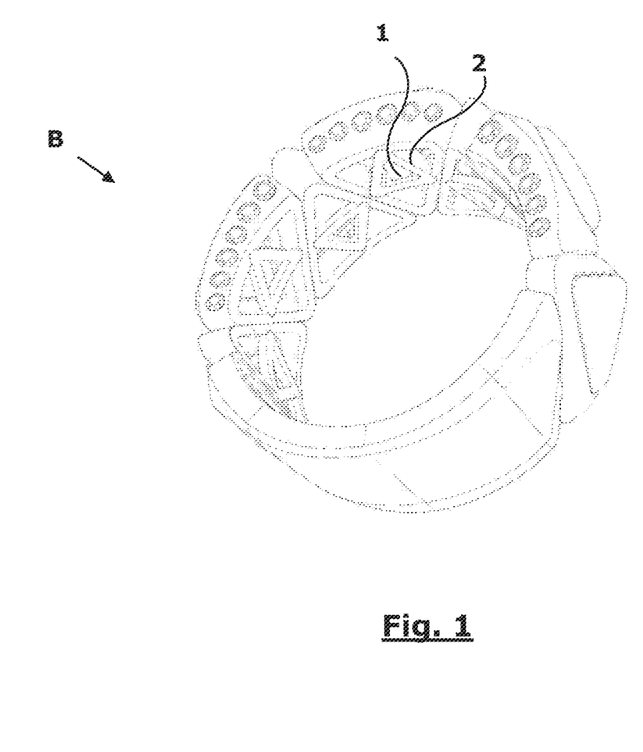
FIG. 1 is a perspective schematic view of an exemplifying jewel wherein a tracking device according to the present invention is embedded.

FIG. 1 shows an exemplifying jewel, in the form of a ring B, wherein a tracking device in the shape of an RFID electronic tag is embedded. However, it is understood that the embedding technique as it will be described in the following is applicable to any other jewelry item.

The tracking device used in the present document is a unique and automatic electronic reconnaissance device which exploits the RFID technology. Such a device typically comprises an RFID tag, equipped—as known—with a memory chip connected to a small antenna which is capable of exchanging information by means of radio waves with an external electronic reading unit, also equipped with a reading antenna. In the RFID tag chip at least a unique code is contained, which uniquely identifies that RFID tag. Possibly, in some versions, the RFID chip has also a part of re-writable memory, meant to record and change other data which change during the lifetime of the RFID tag. The external reading unit, by simple proximity, is arranged to be able to retrieve the chip data by means of the RFID tag antenna.

A passive RFIT tag is preferably used, often also called radio frequency transponder, characterized in that it uses no batteries and in that the energy required for operating is obtained from the same antenna when it is hit by an electromagnetic field of a suitable frequency output by the reading unit. With these typical arrangements, the energy of the electromagnetic field is rather weak, which makes the installation of the RFID tag particularly critical.

Figure 2:
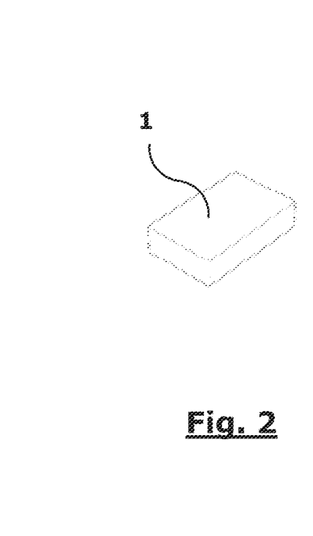
FIG. 2 is a perspective schematic view of a case which embeds a tracking device.
Figure 3:
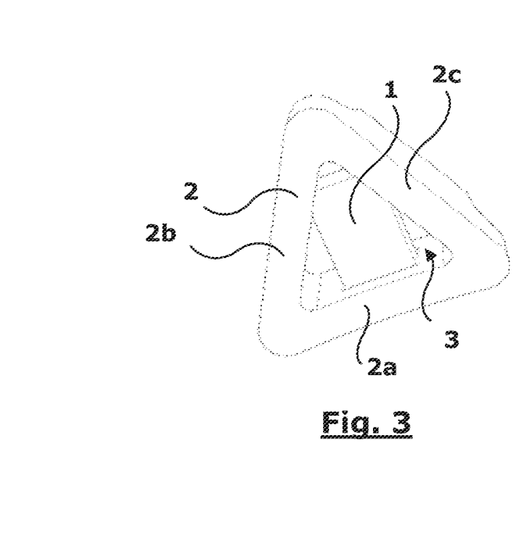
FIG. 3 is a perspective schematic view of the case of FIG. 2 embedded in an anchoring element according to the present invention.

As clearly shown in FIG. 2, according to the invention the RFID tag is encapsulated in a case 1 of impact-resistant material. The case appears to be a container of a substantial parallelepipedal shape, having dimensions slightly larger than the size of the RFID tag used. For example, the case is 2×1,25×0.5 mm. Of course, it is provided the use of smaller cases, in case use is made of an even smaller RFID tag.

Preferably, case 1 is of ceramic material, so as to have a high mechanical strength and an advantageous transparency to electromagnetic waves. In particular, a case 1 is employed made of so-called hi-tech ceramic, extremely scratch-resistant, light and hypoallergenic.

Moreover, as shown in FIGS. 3, 4 and 5A-5C, case 1 is embedded within a particular anchoring element 2 which makes up one of the modular components with which the jewel is made. Therefore, anchoring element 2 is meant, in a subsequent step, to be part of the jewel, for example in ring B.

In general, said anchoring element 2 is a single piece of metal material which substantially has a frame of a hollow geometrical shape, for example the sides of a planar polygon or of a hollow polyhedron with open faces 3.

The frame 2a of element 2 preferably consists of three sides of a triangle, as shown in the drawings, but it can take up also another geometrical shape which fit with the aesthetic design of the specific jewel.

According to an essential feature of the invention, between adjacent sides 2a-2c of the frame which define an open face 3, a portion of case 1 is hosted by geometric coupling. In particular, case 1 engages with a limited number of regions thereof with the sides of the frame of anchoring element 2, comprising either at least two perimeter corners thereof and an opposite edge or at least three points arranged on opposite sides of the center of gravity thereof.

In FIGS. 3-5C anchoring element 2 is shown, which has a frame provided with sides 2a-2c having a substantially quadrilateral cross-section and with an overall hollow triangular layout. The central opening of the open face is also of a triangular shape. The triangular shape of anchoring element 2—equilateral or isosceles, depending on the shape of case 1 and/or of the depth of face 3—is particularly suited for the integral embedding in the jewel B here described, since it offers only three fastening points. As a matter of fact, as can be understood, three fastening points in correspondence of the vertexes of the triangular frame effectively perform the function of equally distributing the external applied forces, as well as representing the minimum number useful for achieving an extremely secure anchoring, capable of withstanding bending deformability, occupying at the same time the smallest possible contact area with metal which makes up jewel B.

Preferably, the size of anchoring element 2 is chosen so as to encircle case 1 with the smallest possible bulk volume.

According to another important feature of the invention, it is provided that on the inner edge of each side 2a, 2b and 2c of the frame, a recess 4 is obtained, suitable to host a small part of case 1 and to block it in position there. On one entry side 2a of one of said sides, the recess is in the shape of a through-slit 4a, through which case 1 can be introduced, until bringing it to the middle of open face 3. The sizing of the frame of element 2 is such that an edge portion of case 1 remains partly inserted in slit 4a.

On the other two sides 2b and 2c, in the embodiment shown, recesses 4 have a limited depth and house two portions of adjacent corners of rectangular case 1.

Case 1 is hence retained, fully exposed in the middle of open face 3 of the frame, blocked only by two corners and one opposite perimeter edge portion in the slit 4a of entry side 2a.

As can be understood, a very small portion of case 1 is hidden by the shielding metal of the frame, while at least 80% of the volume of case 1 (in particular the center of gravity thereof) is exposed in the middle of open face 3 of the anchoring element. Thereby, the RFID tag which is embedded in case 1 is fully devoid of metal shielding and well exposed in the middle of the open face of anchoring polygon 2. In order to further improve this exposure, part of the frame of element 2 can be removed by machining with material removal, for example by a mill. As can be clearly seen in FIGS. 5B and 5C, in the proximity of the areas wherein case 1 engages with recesses 4, the sides 2b and 2c can have bevels or notches 5b and 5c which reduce frame thickness.

Once case 1 is inserted in anchoring element 2, entry slit 4a is closed with molten material of the same nature as frame 2. For example, the closing material may be welded metal filler material, such as a molten droplet of the same metal as the frame, typically gold, white gold, silver or the like.

Alternatively, it is possible to arrange an expendable thickening (not shown) in the entry region of slit 4a, through which case 1 can nevertheless enter tightly into its seat. Once case 1 has been installed, it is possible to act with a brief laser impulse to locally melt the expendable thickening, which melts and expands locally, obstructing the opening of slit 4a.

The local melting which occurs between the filler material or the thickening material and the frame material ultimately blocks case 1 with the RFID tag to the anchoring element, forming a preassembled unit. Any subsequent attempt to remove case 1 from anchoring element 2 would hence produce either the fracture of the case—hence the failure of the RFID tag—or evidence of tampering of the anchoring element.

It is understood that case 1 can be embedded as described above, but it can also be arranged within anchoring element 2 upon the forming of this latter element.

Figure 5A:
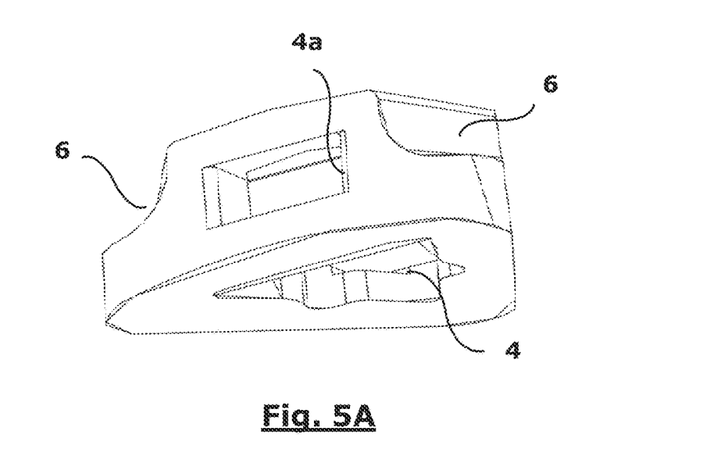
FIGS. 5A-5C are perspective view according to different observation points of a preferred embodiment of the anchoring element according to the invention.

As can be seen in FIG. 5A, an inner face of the anchoring element, that is the face meant to be exposed within the jewel, has a certain curvature, which corresponds to the curvature of the inner surface of the jewel (for example a bracelet or a ring). Instead, on the outer face of the frame—that is, the face meant to be attached to the jewel, attachment bevels 6 are provided.

Figure 4:
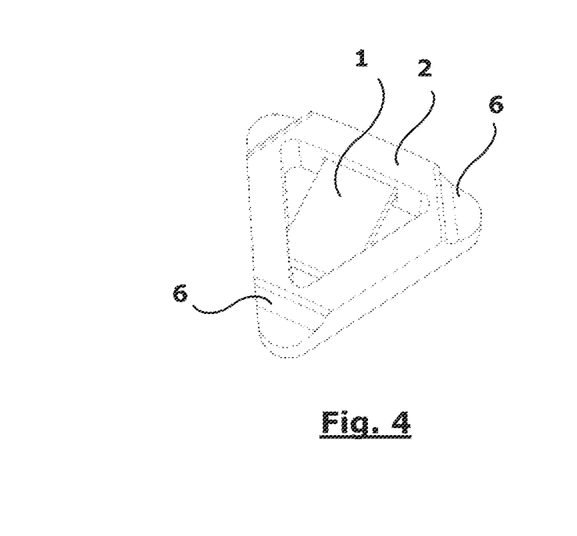
FIG. 4 is a view similar to that of FIG. 3 according to another perspective.
Figure 5B:
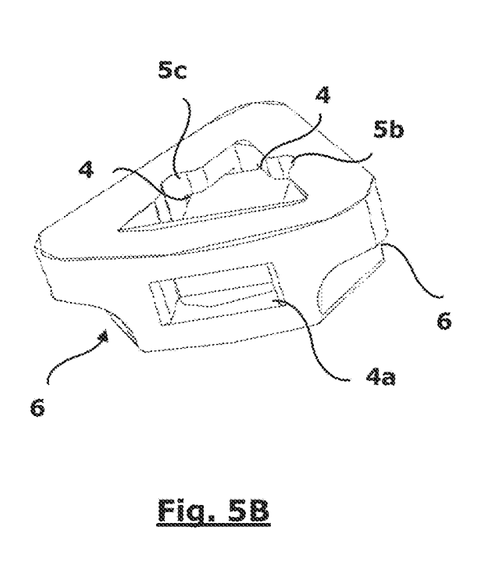
Figure 5C:
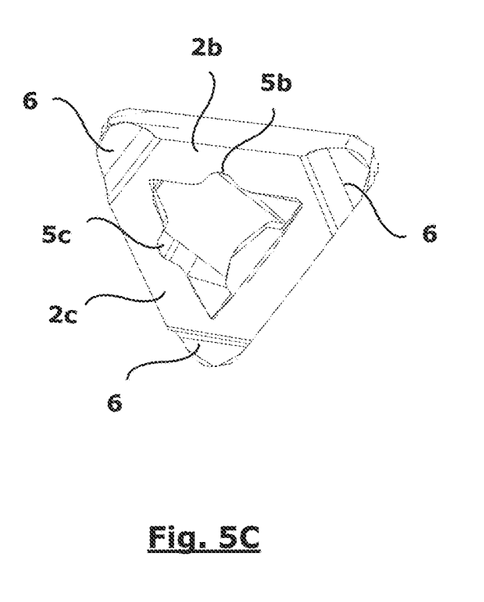

As clearly visible in FIGS. 4, 5B and 5C, bevels 6 are provided on the corner portions of the triangular frame, so as to allow an adequate partial overlapping on another element making up jewel B.

Once the RFID tag has been embedded in the anchoring element, the resulting preassembled unit is installed in a suitably chosen area of jewel B with conventional techniques (for example by welding). Whatever technique is used for fastening the anchoring element to the remaining part of jewel B, said technique does not affect the integrity of case 1. Suggestion is of course to conceive anchoring element 2 so as to be able to join it onto a peripheral part of the jewel, preferably in an inner area which is not particularly exposed to sight when the jewel is worn.

Understandably, for the best success of the embedding method of the present invention, anchoring element 2 and cases 1 are chosen—as a consequence also RFID chips—having size suited to be suitably arranged in the particular jewel B.

The constraint of anchoring element 2 occurs by attaching the metal frame to the remaining portions of jewel B, in particular using bevels 6 in order to better locate it and stabilize it in the desired position, then performing laser micro welding, with no filler material.

As can be understood, the laser micro welding allows to make very thin and accurate welding geometries, with a high degree of fastening and in difficult to access areas.

Preferably, a heat-induction laser micro welding is applied, particularly suited due to the fact that only the surface of the workpiece to be processed is molten, in this case only a short area of bevel 6 which is overlapping the remaining jewel portion.

In addition, the heat-induction laser micro welding is accurate and even, not requiring further processes, such as soldering.

Moreover, unlike other types of welding, such as for example deep welding, with the heat-induction laser micro welding used in this process it is possible to locally melt mainly anchoring element 2, without involving in a disfiguring way jewel B, but leaving nonetheless a small scar on the jewel metal, which would be visible if the preassembled unit were in any way severed from the jewel.

Preferably, during mounting, following welding, any welding residues can be concealed by means of a final finishing and polishing process.

Thereby, anchoring element 2 is perfectly integrally made part of the composition of jewel B, without leaving antiesthetic traces and at the same time making the connection extremely secure. Any severance of anchoring element 2 from jewel B– for example for fraudulent purposes, to replace the RFID tag—would inevitably be made evident, thus automatically defining an anti-burglary protection.

Figure 6:
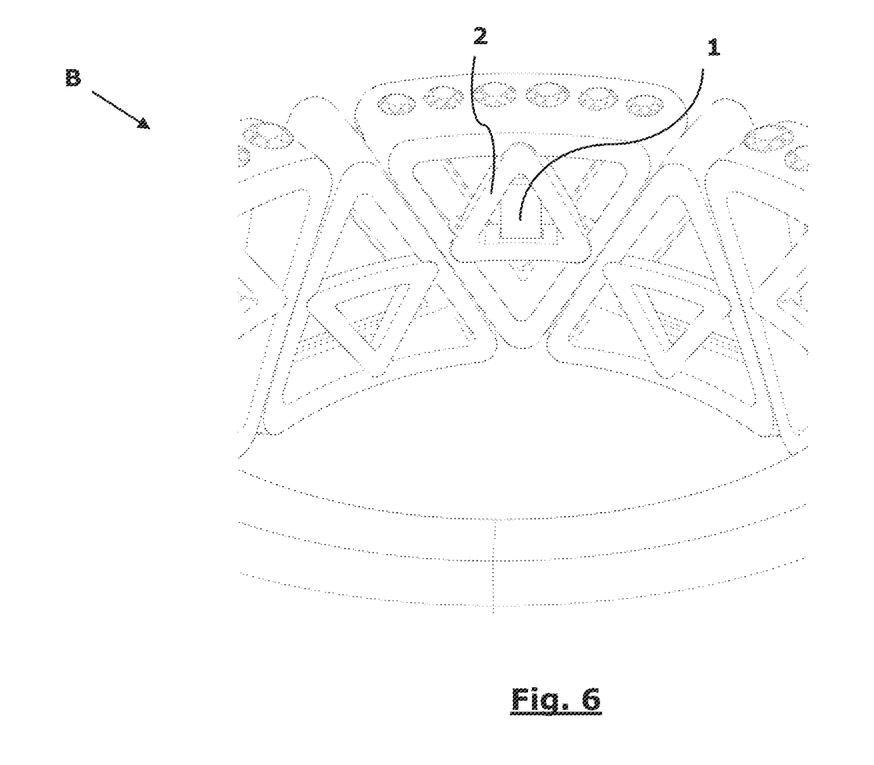
FIG. 6 is a detailed perspective schematic view, with parts removed, of the exemplifying jewel of FIG. 1 wherein the case of FIG. 2 is mounted.

FIG. 6 shows clearly how the anchoring element 2 of the preceding drawings is embedded in a more complex jewel, such as a ring B.

In particular, in the ring B, anchoring element 2 is arranged as being part of a row of ornamental elements of a similar shape, arranged on the inner part of the ring.

Therefore, from FIG. 6 it can be appreciated that anchoring element 2 fits very well the layout of ring B, so much so that case 1—retained in anchoring element 2—is difficult to identify but taking due attention. It can hence be easily understood that the solution represented here offers the pleasant illusion that case 1 is an integrating part of the original design of ring or other jewel B.

Figure 7:
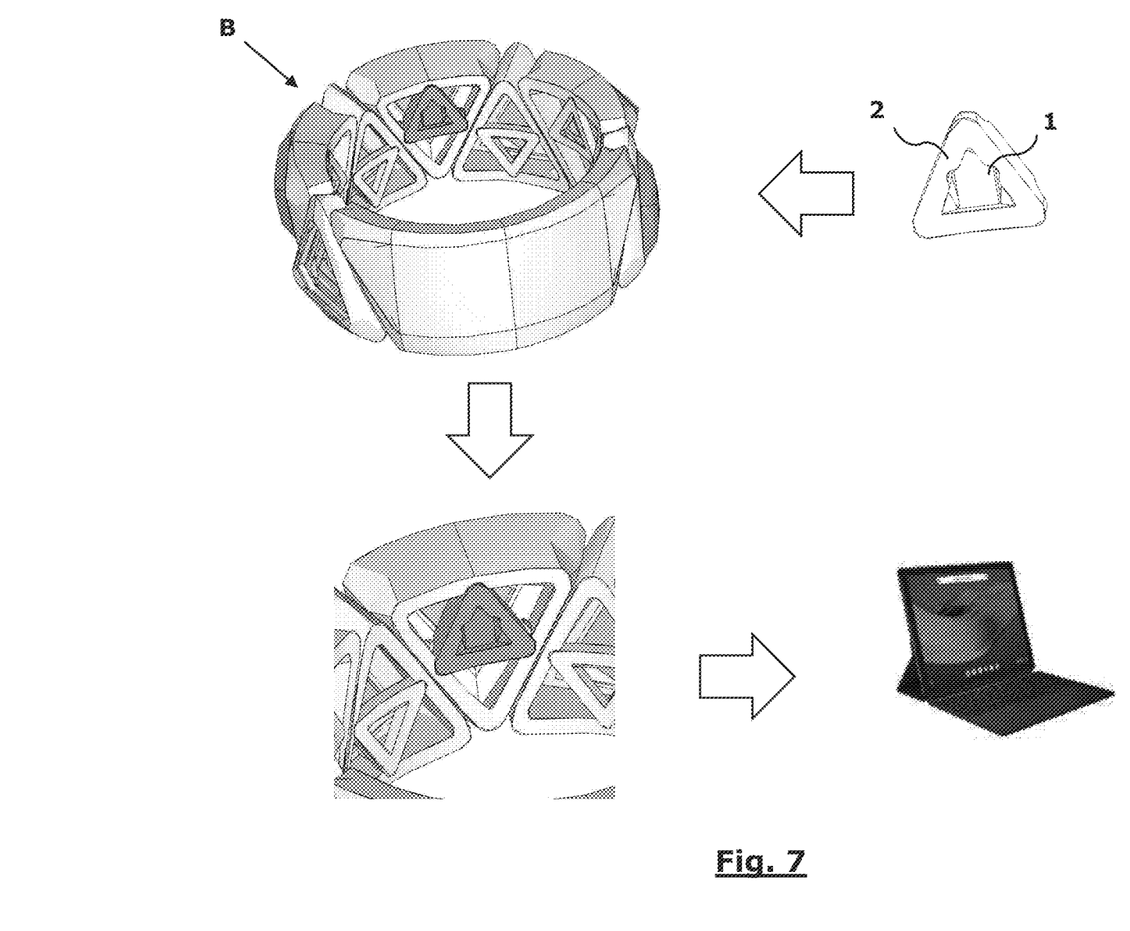
FIG. 7 is an exemplifying flow diagram of the method of use of the tracking device according to the present invention.

FIG. 7 shows in a summary way the various steps which characterize the installing method of the tracking device according to the invention.

In the last step, after having completed jewel B, the unique code of the RFID tag being part of the tracking device is identified, recorded and associated—for example in a database shared in the network with security criteria—with specific information of that jewel, for example which indicate the materials employed, manufacturing date and location, the name of the manufacturers, the certified value and so on.

As a matter of fact, the tracking device of the invention is conceived to be used in a complex tracking system, accessible by authorized users, which contemplates at least a plurality of RFID tag readers, made available to authorized users, a database storage server, wherein the association information between the RFID tags and the relative jewels is stored, as well as a plurality of client workstations from which, through the data detected by the RFID tag reader, it is possible to read the associated information retrieved by the server.

According to a preferred embodiment of the tracking system of the invention, the information associated with the RFID tags is shared through infochain technology, using for example shared blockchain data structures, apt to guarantee integrity, authenticity and non-changeability of such information.

In particular, on a server infrastructure available to the jewel manufacturer, a data certification procedure is devised which uses, as guarantee element, the inclusion of the data in blockchain. The object is to guarantee the entire preparation and design chain of the precious object, in particular supplying:

relevant information along the entire supply chain on the origin of the already processed gold and diamond jewels;

production originality of the precious products, by which it is also possible to certify that the raw materials come from monitored areas and are not the object of illegal activity;

digital authenticity certificates which can follow the individual product, being connected to the data of the relative RFID, for the entire life thereof, even in the event of a change of owner;

public information such as title, description, final price and transfer date;

information on the transactions of which the jewel has been a subject;

information on the owners (respecting the privacy criteria, since the information is not human readable) and on the intellectual and artistic property of the product.

In an InfoChain system a database is provided within which the information of each product is stored, for example the unique codes of four RFIDs, two linked to the RFID tag embedded in the jewel in the way which has been described above and two linked to an RFID tag applied to a package containing the jewel; each row of the database contains a hash of the previous row, so as to guarantee the alteration impossibility of the input information. At the same time, on an application client configured to query the data on the server, it is possible to receive a progressive identification number which represents the row number wherein an output hash has been recorded, within InfoChain.

Periodically (for example at least once every 24 hours or more frequently) on the server a hash calculation of an assembly of rows of the database is performed and the hash information is transmitted and stored on a public blockchain such as Ethereum or Bitcoin and the return code obtained from said writing on blockchain is entered in the database.

The guarantees obtainable in the purchase-sale process at the shops/retailers.

In the purchase process by customers of the jewel equipped with the system according to the invention, the guarantees on the product—in addition to the InfoChain contribution—are provided by the packages which are trackable through the corresponding RFID tags applied to the box. The packaging is tamper-proof. Particularly expensive jewels can be put into a blister equipped with a code (Q-code, for example) readable from the outside through a smartphone-supported application, for example. Thereby the purchaser can track his or her package and the seller can verify the occurred delivery thereof.

The purchaser can analyze the digital certificate connected to the product, through a suitable application client, verify the integrity thereof obtained through the digital signature of said certificate; upon taking the decision to purchase the product, the purchaser can sign the purchase deed through a digital contract digitally signed between the parties.

Such contract can become an integral part of the information related to the history of the precious product and can also be entered in the database wherein the information is tracked through the blockchain as previously described.

Online Purchase-Sale Process (Website)

Due to the system according to the invention, it is possible to finalize a sale online, too; the guarantees on the product are provided by the InfoChain side, authorizing the potential purchaser (suitably identified user) to view the quality certificate, allowing the verification of the authenticity thereof and of the integrity of the digital signature therein contained and allowing to view all the information linked to the server part on infoChain. Upon taking the decision to purchase the product, the user must proceed with the registration step on an identification form, provided for example on a website, supplying a series of information apt to guarantee the reliability thereof; the system records the user and associates with it security authentication mechanisms, as Two-factor such Strong Authentication.

The user, following a subsequent authentication, can sign the purchase deed through a digital contract digitally signed between the parties: the contract can be signed directly on the user's interface, for example through electronic signature activated through OTP obtained via SMS or through an APP downloaded directly from the seller's or intermediary's website.

The purchase contract becomes an integrating part of the information related to the jewel history and is also entered in the database as previously described.

Since the registration and after the purchase of a jewel, the users enabled by the system according to the invention will be able to see, through their account, all the information regarding the integrity, authenticity and trackability of their purchases; they will be able to follow all the changes of processing, maintenance, etc. related to the purchased jewel.
Resale of Jewelry In the case of resale of the precious product, the inherent features of the InfoChain platform guarantee the new purchaser with reference to the authenticity of the product which he or she is about to purchase from a previous owner.

The information connected to the precious products in the resale step can be at the minimum:
- public information: title, description, final price and transfer date;
- transactions which the jewel has been the subject of during its lifetime
- owners' name
- intellectual and artistic property of the product.

Precisely in the light of this information, a jewel's own identity card is created, thus allowing to block the improper purchase of valuables subject of theft through a query on the world databases owned by manufacturing firms.
Jewel Maintenance In view of the security offered by the system, the user will also be more willing to grant permission to third parties for possible maintenance and cleaning operations of his or her precious product. Thereby new scenarios open wherein sellers and intermediaries can easily offer a maintenance and cleaning service of the jewels: clients can ship the purchased jewels and make use of the gemstone maintenance service and the metal cleaning and polishing service. Through the RFID tags it is possible to guarantee the truthfulness of the jewel and all the additional maintenance information ends up updating the information contained in the product database and consequently in the blockchain infrastructure used.

Hence, as can be clearly understood from the above-reported description, the embedding method, and relative system, according to the present invention allows to perfectly achieve the set objects.

The fastening mode of the RFID tag to the jewel, through embedding of the case into the anchoring element and subsequent laser welding allows to retain in a secure manner the RFID tag, despite leaving it suspended on an open face, hence best reducing any shielding effect. As a result, in the immediate vicinity of case 1, which is made of material transparent to electromagnetic waves, no enshrouding covering of insulating material is present, such as epoxy resins or other various types of adhesive.

Therefore, the antenna of the RFID tag is capable of establishing an electromagnetic coupling with the reading unit more effectively, more securely and more lastingly.

Moreover, the integration mode of the case in the polygonal frame offers a reduced contact surface with case 1 and hence a less enshrouding configuration, so as to remarkably reduce the arising of destructive electromagnetic phenomena which interfere with the standard transmission between the RFID tag and the reading unit.

In addition, the closing of the seat with metal filler material or with thickening material and laser micro welding, preferably heat-inducing laser micro welding, allow to obtain a unique constraint between RFID tag and precious product, without impairing the jewel appearance, but leaving a sufficient signature to establish if tampering has occurred.

Finally, the proposed configuration perfectly integrates with the jewel appearance and makes almost invisible the presence of the tracking device.

However, it is understood that the invention must not be considered limited to the particular embodiments illustrated above, which make up only non-limiting examples of the scope of the invention, but that different variants are possible, all within the reach of a person skilled in the field, without departing from the scope of protection of the invention, which is defined exclusively by the following claims.

For example, although a ceramic case has been shown with a rectangular parallelepipedal shape, it is understood that the shape could also be different depending on the need of embedding the peripheral portions thereof into the seats of a specific metal frame shape.

Furthermore, it is understood that the RFID technology can be replaced by other similar proximity reading technologies of a unique identification code, available also in the future.

Finally, although for the sake of simplicity reference has always been made to a typical jewel shaped as a ring or bracelet, it is understood that the invention is applicable also to other types of metal valuables, for example watches and other jewelry to be worn or collected.

The invention claimed is:

1. A method of embedding a tracking device in a metal precious object, the tracking device comprising at least an electronic tag with a unique identification, the data of which are detectable through a proximity reading device, characterized in that it comprises the steps of:
   - embedding said electronic tag with a unique identification in a ceramic case (1),
   - embedding said ceramic case (1) into an anchoring element (2) in the shape of a metal frame with open faces, so that the majority of said case (1) is exposed in the middle area of one of said open faces,
   - joining said anchoring element (2) to a portion of said metal precious object, through laser micro welding and wherein said step of embedding said ceramic case (1) provides to
   - define at least a recess (4, 4a) for each side (2a, 2b, 2c) of said metal frame apt to house at least a portion of corner or of edge of said case (1), one of said recesses on an entry side (2) being in the shape of a through-slit (4a), and
   - locating said case (1) inside the perimeter of said metal frame through said through-slit (4a) and blocking it there by local melting of material of the same nature of said metal frame so as to obstruct an opening of said through-slit (4a).

2. The method as in claim 1, wherein said metal frame of the anchoring element (2) has a polygonal shape.

3. The method as in claim 1, wherein an external face of said metal frame of the anchoring element (2) has attachment bevels (6) on corner portions, which are fastened to said metal precious object by means of said laser micro welding with no filler material.

4. The method as in claim 1, wherein said local melting of material which obstructs said opening of the through-silt (4a) provides the melting of a partial thickening of said through-slit (4a).

5. The method as in claim 1, wherein said local melting of material which obstructs said opening of the through-slit (4a) provides the melting of metal filler material.

6. An anchoring element (2) for embedding a ceramic case (1) containing an electronic tag with unique identification, to a metal precious object, comprising a metal frame weldable to said metal precious object, characterized in that said metal frame has a polygonal geometric shape with open faces, comprising at least three sides (2a, 2b, 2c) each one provided with a recess (4) apt to house at least a corner portion of said case (1), one of said recesses on an entry side (2) being in the shape of a through-slit (4a).

7. The anchoring element (2) as in claim 6, wherein said through-slit (4a) has an expendable local thickening, apt to be molten to occlude an opening of said through-slit (4a).

8. The anchoring element (2) as in claim 6, wherein said frame defines two opposite faces, an inner face provided with a curvature and an outer face provided with at least three bevels (6) in correspondence of corner regions.

9. A tracking method of a metal precious object, the method comprising the steps of:
embedding a tracking device in a metal precious object with a method according to claim 1,
recording in a database of a remotely accessible server, at least a unique code identifying an electronic tag identifying said tracking device, and
associating, in said database, said unique code with information on said precious object.

10. The tracking method as in claim 9, wherein at least said information on said precious object undergo certification through blockchain technology.

* * * * *